(12) United States Patent
Lambert et al.

(10) Patent No.: US 10,175,717 B2
(45) Date of Patent: Jan. 8, 2019

(54) SYSTEM AND METHOD FOR ENHANCING REAL-TIME CLOCK USAGE IN AN INFORMATION HANDLING SYSTEM

(71) Applicant: DELL PRODUCTS, LP, Round Rock, TX (US)

(72) Inventors: Timothy M. Lambert, Austin, TX (US); Jeffrey L. Kennedy, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 99 days.

(21) Appl. No.: 15/471,821

(22) Filed: Mar. 28, 2017

(65) Prior Publication Data

US 2018/0284837 A1 Oct. 4, 2018

(51) Int. Cl.
*G06F 1/14* (2006.01)
*G06F 21/86* (2013.01)

(52) U.S. Cl.
CPC .............. *G06F 1/14* (2013.01); *G06F 21/86* (2013.01); *G06F 2221/2151* (2013.01)

(58) Field of Classification Search
CPC ..................................... G06F 1/14; G06F 21/86
See application file for complete search history.

(56) References Cited

U.S. PATENT DOCUMENTS

| 7,197,657 | B1 * | 3/2007 | Tobias | ...................... G06F 1/14 713/400 |
| 7,716,515 | B2 | 5/2010 | Shih | |
| 8,308,819 | B2 * | 11/2012 | Kirschner | ............. G06F 21/554 726/34 |
| 2008/0034239 | A1 | 2/2008 | Lambert et al. | |
| 2014/0089714 | A1 * | 3/2014 | Pedersen | ............... G06F 1/3243 713/324 |

* cited by examiner

*Primary Examiner* — Stefan Stoynov
(74) *Attorney, Agent, or Firm* — Larson Newman, LLP

(57) ABSTRACT

An information handling system includes a processor complex and a microcontroller unit (MCU). The processor complex includes a Real-Time Clock (RTC) function associated with a port of the processor complex, and that can be invoked on the processor complex by a call to the port. The MCU includes RTC logic to maintain time base information for the information handling system. When the RTC function is invoked, the processor complex traps the call to the port and redirects the call to the MCU. When the MCU receives the redirected call, the MCU invokes the RTC logic to respond to the redirected call and to provide the time base information to the processor complex.

20 Claims, 2 Drawing Sheets

SYSTEM AND METHOD FOR ENHANCING REAL-TIME CLOCK USAGE IN AN INFORMATION HANDLING SYSTEM

FIELD OF THE DISCLOSURE

This disclosure generally relates to information handling systems, and more particularly relates to enhancing real-time clock usage in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor complex and a microcontroller unit (MCU). The processor complex may include a Real-Time Clock (RTC) function associated with a port of the processor complex, and that can be invoked on the processor complex by a call to the port. The MCU may include RTC logic to maintain time base information for the information handling system. When the RTC function is invoked, the processor complex may trap the call to the port and redirect the call to the MCU. When the MCU receives the redirected call, the MCU may invoke the RTC logic to respond to the redirected call and to provide the time base information to the processor complex.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
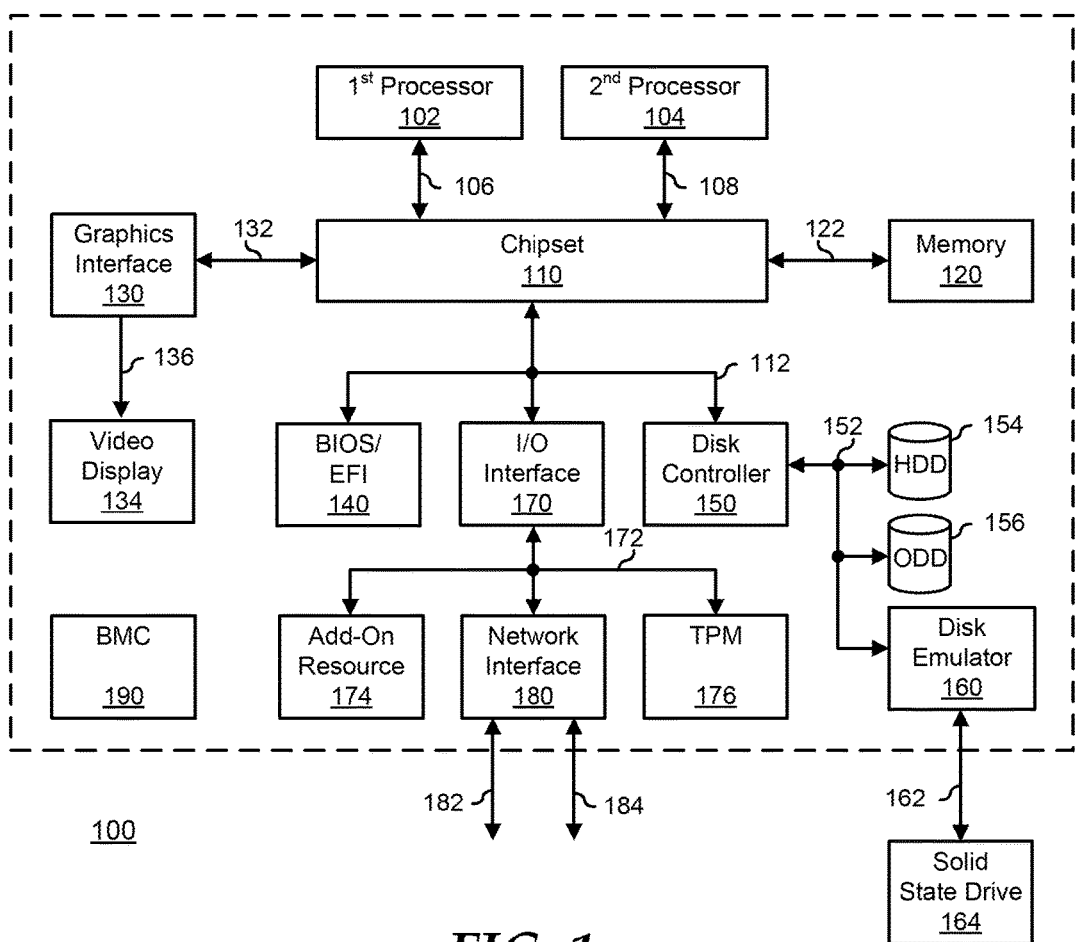
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, and a baseboard management controller (BMC) 190. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100, and BMC 190 provides a management environment for the information handling system.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

BMC 190 represents one or more processing devices, such as a dedicated BMC System-on-a-Chip (SoC) device, one or more associated memory devices, one or more network interface devices, and the like, that operate together to provide the management environment for information handling system 100. In particular, BMC 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. BMC 190 can include a network connection to an external management system, and the BMC can report status information for information handling system 100, receive BIOS/UEFI or system firmware updates, or other control information for managing and controlling the operation of the information handling system. BMC 190 can operate off of a separate power plane from the components of the host environment so that the BMC receives power to manage information handling system 100 when the information handling system is otherwise shut down. An example of BMC 190 includes a commercially available BMC product that operates in accordance with an Intelligent Platform Management Initiative (IPMI) specification, such as a Integrated Dell Remote Access Controller (iDRAC), or the like.

Figure 2:
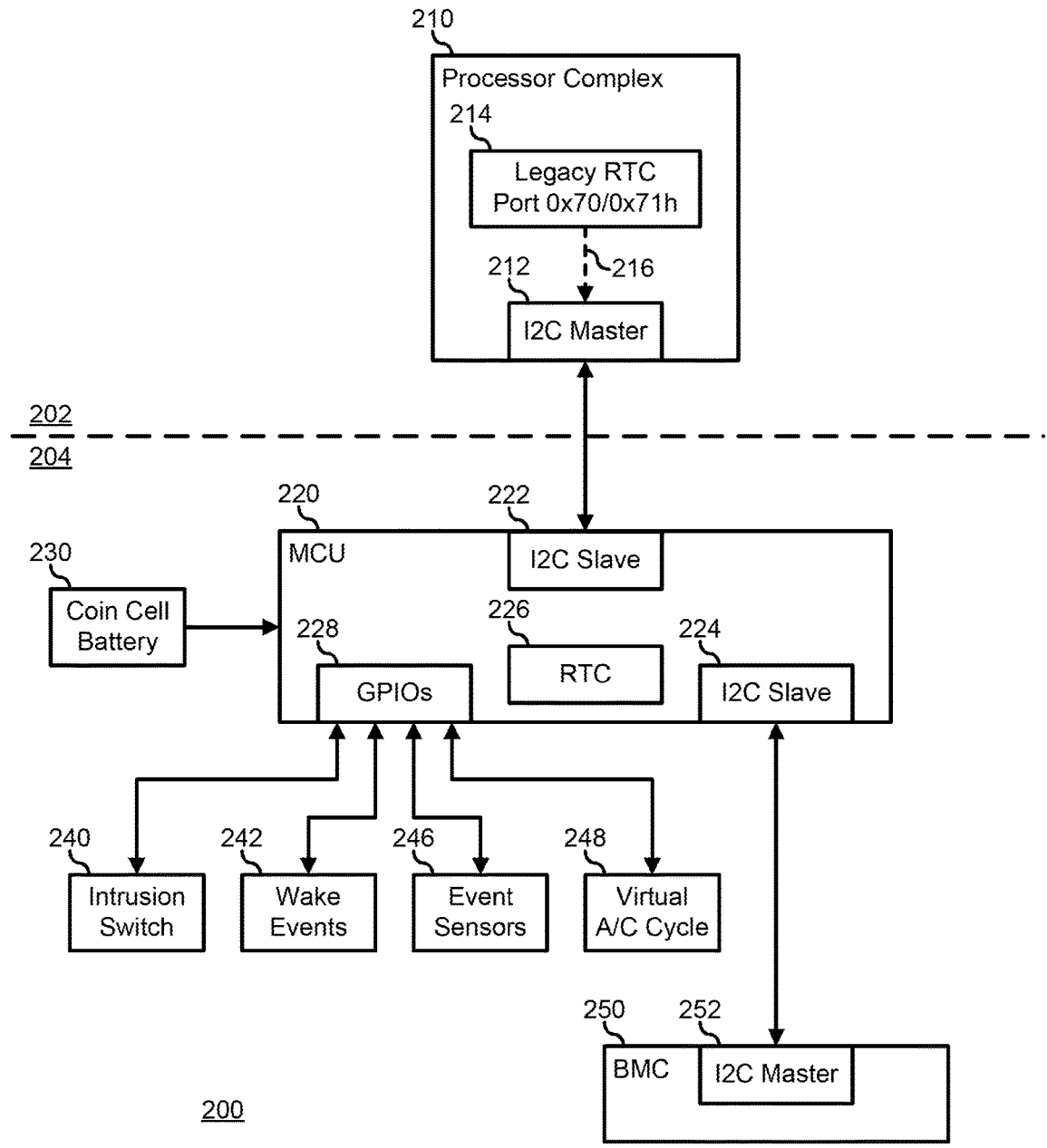
FIG. 2 is a block diagram illustrating an information system according to an embodiment of the present disclosure.

FIG. 2 illustrates an information handling system 200 according to an embodiment of the present disclosure. Information handling system 200 includes a host environment 202 and a management environment 204. Host environment 202 includes a processor complex 210. Management complex 204 includes a micro-controller unit (MCU) 220, a battery 230, an intrusion switch 240, wake events logic 242, events sensors 244, virtual reset cycle logic 248, and a BMC 250. Processor complex 210 includes an Inter-Integrated Circuit (I2C) master interface 212 and a Real Time Clock (RTC) function 214 accessible on a legacy port 0x70h/0x71. In a particular embodiment, RTC function 214 is implemented by a chipset component of processor complex 210, or by another I/O processor component, as needed or desired. MCU 220 includes an I2C slave interface 222 connected to I2C master interface 212 of processor complex 210, an I2C slave interface 224 connected to an I2C master interface 252 of BMC 250, a RTC function 226, and various General Purpose Inputs/Outputs (GPIOs) 228. Battery 230 is connected to provide power to MCU 210 to provide various functionality of GPOIs 228 and RTC 226, and to permit interactions with BMC 250, as described further, below.

Host environment 202 operates to provide data processing functionality of information handling system 200, such as is typically associated with information handling system 200. As such, processor complex 210 represents a data processing apparatus, such as one or more central processing units (CPUs) or processor cores, and the associated data input and output I/O functionality, such as a chipset component or another I/O processor component. Processor complex 210 operates to execute machine-executable code to perform the data processing tasks associated with information handling system 200.

Management environment 204 operates to implement and manage various maintenance, operation, and system update processes for information handling system 200 that are not typically associated with the data processing functionality of the information handling system. For example, management environment 204 may provide for out-of-band management of the various code executed on host environment 202, such as BIOS code or UEFI code, firmware code, programs, applications, operating systems, and the like. In particular, management environment 204 can operate on a different power plane than host environment 202, such that the management environment can download and store updated code for the host environment, even when the host environment is powered off. Management environment 204 also operates to monitor and maintain the functions and features of information handling system 200 that are not necessarily associated with the data processing operations performed by host environment 202, such as system thermal and cooling management, fan speed adjustment, power supply monitoring and adjustment, and the like. The mechanisms and method of system management via a BMC are known in the art and are beyond the scope of the present disclosure.

During the system boot process of information handling system 200, and during normal operations, processor complex 210 utilizes the functionality of a real-time clock to establish a time base for various operations, to maintain a secure operating environment, and for other purposes. Typically, a system Basic Input/Output System (BIOS) or Unified Extensible Firmware Interface (UEFI) accesses the real-time clock function by making calls to RTC function 214 to read a time value from, or write a time value to the real-time clock. In legacy designs, a coin cell battery was utilized to maintain power to the real-time clock function. Typically, such a coin cell battery provided, for example, a 3 Volt power rail to power the real-time clock function when system power is shut down. However, newer system components, such as processors and chipsets operate at a 1.5 Volt or a 1.8 Volt level. So, information handling systems that utilize such newer system components typically include a Linear Drop-Out (LDO) voltage regulator, an integrated circuit device that converts the 3 Volt power rail from the coin cell battery to the operating voltage level of the newer system components. Such a design approach necessitates a much larger coin cell battery to maintain a typical operational duty cycle, because of inefficiencies introduced in the voltage conversion process. Moreover, the addition of the LDO voltage regulator to a typical information handling system design, in combination with the larger coin cell battery, results in a much larger footprint on a Printed Circuit Board (PCB) of the information handling system. Thus, maintaining a legacy real-time clock function on an information handling system that utilizes newer system components results in a more costly and less space efficient design than was the case when no voltage conversion was required.

In a particular embodiment, MCU 220 operates at a 3 Volt power rail from battery 230 when system power is shut down, without the need to add a LDO voltage regulator. Thus the design approach of information handling system 200 does not necessitate the larger coin cell battery of the legacy information handling system as described above. As such, battery 230 can be implemented by much smaller battery devices, such as by a pair of 1.45 Volt hearing aid type batteries. In another embodiment, MCU 220 operates at a 1.45 Volt power rail from battery 230, and the battery can be implemented by a single 1.45 Volt hearing aid type battery. The power provided to MCU 220 by battery 230 operates to maintain power to RTC 226 when system power is shut down. In particular, RTC 226 provides a time base for information handling system 200 for keeping track of the current time and date. In another embodiment, a RTC is provided that is external to MCU 220 and is connected to another GPIO input of GPIOs 228. Here, in a particular case, the RTC can include its own battery for maintaining the time base information when the system power is shut down. In this case, battery 230 can be sized even smaller or can be specified to hold power to MCU 230 for a longer duration. In either case, by maintaining RTC 226 in management environment 204, rather than in host environment 202, other advantages are provided, such as the ability to synchronize the time-based operations of the management environment and the host environment, as described further, below.

In host environment, when an application needs to read the current time, the system BIOS or UEFI posts a read to RTC function 214, but processor complex 210 traps 216 the read function and issues a System Management Mode (SMM) interrupt to call a SMM interrupt handler. The SMM interrupt handler invokes I2C master 212 to issue an RTC read that is addressed to MCU 220 via I2C slave 222 to read the time from RTC 226. MCU 220 provides the requested time base information back to processor complex 210, and the SMM interrupt handler places the time base information in the port 0x70/0x71 location and suspends from the interrupt. Then the system BIOS or UEFI reads the time base information from the port 0x70/0x71 location. Further, when an application attempts to write to RTC function 214, processor complex 210 traps the write, and disallows the manipulation of the time base maintained by RTC 226 from host environment 202. In this way, the time base maintained by RTC 226 is more secure from attempts to manipulate the time base for various nefarious purposes. Instead, the time base information of RTC 226 is maintained in management environment 204. Here, BMC 250 operates to invoke I2C master 252 to issue RTC reads and writes that are addressed to MCU 220 via I2C slave 224 to read or write the time base information. Note that as used herein an application can include a program, an operating system, an API, or the like.

In addition to the advantages of providing RTC 226 within MCU 220, and particularly within management environment 204, the maintenance of power from battery 230 to the MCU when system power is shut down permits GPIOs 228 to remain powered to permit processing of input and output information with intrusion switch 240, wake events logic 242, events sensors 244, and virtual reset cycle logic 248. For example, intrusion switch 240 operates to provide an intrusion signal when a lid or cover of information handling system 200 is open. Here, in conjunction with RTC 226, the receipt of the intrusion signal is time-stamped to provide a picture of when the lid or cover of information handling system 200 was opened, and for how long. In this way, unauthorized tampering with information handling system 200, such as via a man-in-the-middle physical attack can be detected and identified.

Further, events handled by wake events logic 242 are handled by MCU 220 when the system power is shut down. Here, such events as a Wake-On-Lan or Wake-On-Ring events can be processed by MCU 220, and the MCU can direct Virtual A/C cycle logic 248 to turn on system power to information handling system 200 to boot the information handling system. In addition, information from intrusion switch 240 is readily incorporated into the decision as to whether or not to turn on the system power to information handling system 200. For example, a decision to turn on the system power can be suspended when intrusion switch 240 provides the intrusion signal, so that a system technician working on information handling system 200 is not harmed while working on the information handling system, such as by receiving an electric shock or by being injured by a system fan that is unexpectedly turned on. Additionally, event sensors 246 are utilized to determine whether or not various deleterious events have occurred to information handling system 200. For example, event sensors 246 can include shock sensors that detect whether information handling system 200 was dropped, humidity sensors and temperature sensors that detect whether adverse environmental conditions were experienced, tip sensors that detect whether the information handling system was turned over, or other sensors, as needed or desired.

Here, maintaining RTC 226 within management environment 204, either as a part of MCU 220, or as an external device that is connected to another GPIO of GPIOs 228, the monitoring and management of information handling system 200 is improved. This is because intrusion switch 240, wake events logic 242, event sensors 246, and virtual A/C power cycle logic 248 can be configured to be incorporated with time stamp information to know when various events occurred and for how long. Were the RTC located in host environment 202, such events could only be time stamped based upon a clock that is local to management environment 204, and that may not be synchronized with the host environment. Moreover, the time base information as stored in RTC 226 can be maintained out-of-band from host environment 202 via BMC 250, even when system power is turned off.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a processor complex including a Real-Time Clock (RTC) function associated with a port of the processor complex, and that can be invoked on the processor complex by a call to the port; and
    a microcontroller unit (MCU) including RTC logic to maintain time base information for the information handling system;
    wherein when the RTC function is invoked, the processor complex traps the call to the port and redirects the call to the MCU; and
    wherein when the MCU receives the redirected call, the MCU invokes the RTC logic to respond to the redirected call and to provide the time base information to the processor complex.

2. The information handling system of claim 1, further comprising:
    a battery coupled to provide power to the MCU when system power to the processor complex is shut off.

3. The information handling system of claim 2, further comprising:
    a Baseboard Management Controller (BMC) coupled to the MCU to write the time base information to the RTC logic.

4. The information handling system of claim 3, further comprising:
    an intrusion detection switch coupled to the MCU and configured to provide an indication when a cover of the information handling system is removed;
    wherein the MCU is configured to provide a timestamp to the indication based upon the time base information.

5. The information handling system of claim 3, further comprising:
    an event sensor coupled to the MCU and configured to provide an indication when a physical event occurs to the information handling system;
    wherein the MCU is configured to provide a timestamp to the indication based upon the time base information.

6. The information handling system of claim 5, wherein the physical event includes a mechanical shock to the information handling system.

7. The information handling system of claim 5, wherein the physical event includes a temperature experienced by the information handling system.

8. The information handling system of claim 5, wherein the physical event includes a tip event experienced by the information handling system.

9. An method, comprising:
    providing, by a processor complex of an information handling system, a Real-Time Clock (RTC) function associated with a port of the processor complex;
    providing, by a microcontroller unit (MCU) of the information handling system, RTC logic;
    maintaining, by the RTC logic, time base information for the information handling system;
    receiving, by the processor complex, a call to the RTC function;
    invoking, by the processor complex, the RTC function in response to receiving the call;
    trapping, by the processor complex, the call in response to invoking the RTC function;
    redirecting, by the processor complex, the call to the MCU;
    receiving, by the MCU, the redirected call;

invoking, by the MCU, the RTC logic to obtain the time base information; and providing, by the MCU, the time base information to the processor complex.

10. The method of claim 9, further comprising:

coupling a battery to provide power to the MCU when system power to the processor complex is shut off.

11. The method of claim 10, further comprising:

coupling a Baseboard Management Controller (BMC) to the MCU; and writing, by the BMC, the time base information to the RTC logic.

12. The method of claim 11, further comprising:

providing an intrusion detection switch coupled to the MCU;

configuring the intrusion detection switch to provide an indication when a cover of the information handling system is removed; and providing, by the MCU, a timestamp to the indication based upon the time base information.

13. The method of claim 11, further comprising:

providing an event sensor coupled to the MCU;

configuring the event sensor to provide an indication when a physical event occurs to the information handling system; and providing, by the MCU, a timestamp to the indication based upon the time base information.

14. The method of claim 13, wherein the physical event includes a mechanical shock to the information handling system.

15. The method of claim 13, wherein the physical event includes a temperature experienced by the information handling system.

16. The method of claim 13, wherein the physical event includes a tip event experienced by the information handling system.

17. An information handling system, comprising:

a Baseboard Management Controller (BMC);

a microcontroller unit (MCU) including RTC logic to maintain time base information for the information handling system; and a battery coupled to provide power to the MCU when system power to the processor complex is shut off;

wherein, the MCU is configured to:
  receive the time base information from the BMC;
  receive a call to the RTC logic; and
  provide the time base information in response to receiving the call.

18. The information handling system of claim 17, further comprising:

an intrusion detection switch coupled to the MCU and configured to provide an indication when a cover of the information handling system is removed;

wherein the MCU is configured to provide a timestamp to the indication based upon the time base information.

19. The information handling system of claim 17, further comprising:

an event sensor coupled to the MCU and configured to provide an indication when a physical event occurs to the information handling system;

wherein the MCU is configured to provide a timestamp to the indication based upon the time base information.

20. The information handling system of claim 19, wherein the physical event includes one of a mechanical shock to the information handling system, a temperature experienced by the information handling system, and a tip event experienced by the information handling system.

* * * * *